Feb. 25, 1936.  E. W. KELLOGG ET AL  2,031,836
SOUND AND PICTURE CAMERA
Filed June 3, 1933
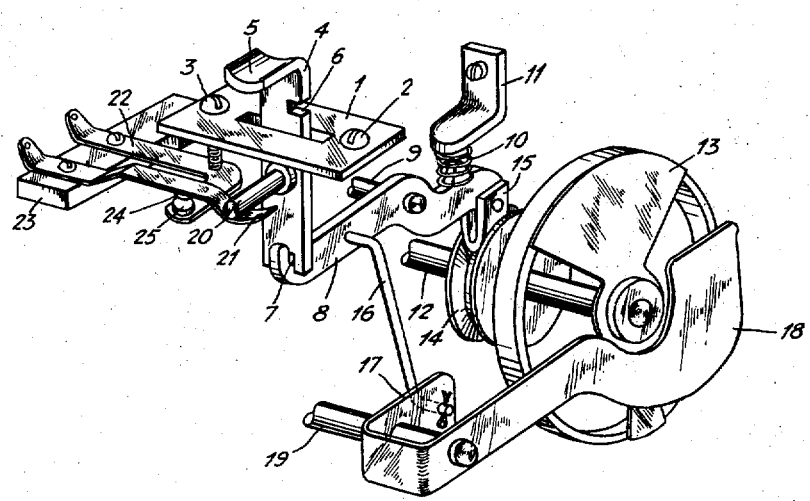
INVENTORS
EDWARD W. KELLOGG
AND SILVEY READ JR
BY
H. S. Grover
ATTORNEY Patented Feb. 25, 1936

2,031,836

UNITED STATES PATENT OFFICE 2,031,836

SOUND AND PICTURE CAMERA

Edward W. Kellogg, Moorestown, and Sidney Read, Jr., Haddonfield, N. J., assignors to Radio Corporation of America, a corporation of Delaware Application June 3, 1933, Serial No. 674,130

7 Claims. (Cl. 88—16.2)

This invention relates to sound and picture cameras, and relates more particularly to an improved control mechanism for initiating and controlling the operation of the several parts thereof.

In apparatus of this nature, it is necessary to control both the mechanical operation of the camera and the operation of the electrical sound recording apparatus in conjunction therewith, and these several elements must be controlled in properly timed relation in order to avoid waste of film. It is particularly necessary that this be accomplished automatically in the amateur types of apparatus such as the 16 mm. cameras, and we have accordingly devised a mechanism for controlling the various parts of such apparatus which is very effective in operation.

One object of the invention is to provide means for obscuring the picture exposure aperture when the apparatus is not in operation.

Another object of the invention is to provide brake means for promptly stopping the mechanism, and which is controlled by the starting means.

Another object of the invention is to provide a switch controlled by the starting lever which turns on the current for the sound recording mechanism after the motion picture mechanism has reached the proper speed.

Another object of the invention is to provide such a switch which may be so actuated as to turn on the sound recording mechanism for purposes of inspection or test without starting the motion picture apparatus.

Other objects and functions of the apparatus will hereinafter more fully appear.

The one figure of drawing shows our improved camera controlled mechanism as bodily removed from a motion picture camera.

The lock plate 1 defines the plane of an upper surface of the camera mechanism into which the said plate is attached by the screws indicated at 2 and 3. Through this lock plate passes the control lever 4 which carries at its upper end a finger-piece 5. This control lever is also provided with a notch 6 which is adapted to fit over the front edge of the slot in the lock plate and thereby retain the control lever in the depressed position.

A notch 7 in the lower end of the control lever is mounted in universally pivoted relation upon the lever 8 which supports the member 4. This lever 8 is pivoted upon the shaft 9 and is maintained in the stopped position by the spring 10 which, as shown, fits over a projection on a lever 8, the other end of which spring is retained under compression by the bracket 11 which is mounted inside of the camera.

The shutter shaft 12 carries the usual rotary shutter 13 and is driven by a spring motor, and this shaft also carries the brake drum 14. The end of the lever 8 is provided with an appropriate brake shoe of leather or the like indicated at 15 which in the "stopped" position is held firmly against the brake drum 14 by the spring 10.

It will be clear that downward pressure on the finger-piece 5 raises the brake shoe 15 and permits rotation of the shutter.

Connected to the lever 8 between the shaft 9 and the pivotal connection 7 is a link member 16 which is connected to the shank 17 of the shutter 18. This shutter 18 is pivoted upon the fixed shaft 19 as shown and when the finger-piece 5 is depressed the member 18 is moved downwardly from between the lens and the exposure aperture of the camera thereby permitting shutter 13 to control the exposure of the film in the usual fashion.

The lever 4 carries extending from the side thereof an insulated pin 20 which serves to control the operation of the sound recording mechanism. This pin 20 normally rests upon the upper surface of the contact spring 21 which is shaped as shown for a purpose later to be described. A second contact spring 22 is mounted upon the strip of insulating material 23 which also supports the spring 20. These two contact springs carry a pair of electrical contacts of appropriate material indicated at 24 and 25. These contacts are so spaced that when the finger-piece 5 is depressed at an ordinary rate of speed the brake shoe 15 is first released, permitting the motion picture mechanism to come up to speed and thereafter the contacts 24 and 25 engage, thereby closing the necessary circuits through the sound recording mechanism, and particularly to the exciter lamp thereof, and thus causing the apparatus to be in condition to record sound only after it has reached proper speed.

If, after the finger-piece 5 has been depressed to the proper extent, it is pressed forwardly, the notch 6 will engage the forward portion of the lock plate 1 and retain the mechanism in operation until the lever 4 is released by a rearward motion of the finger-piece 5.

The function of the curved portion of the spring 21 will now be described: It is sometimes desirable, for one reason or another, to turn on the exciter lamp and another sound recording mechanism without starting the motion picture apparatus. It will be noticed that the curvature of the outer end of the spring 21 is such that if the lever 4 is depressed vertically or even tilted forward so that the notch 6 engages the plate 1, the vertical movement of the contact 24 will correspond to the vertical movement of the lever 4. The rear portion of the curved part is as shown in the drawing curved much more steeply than the forward portion, and therefore if the fingerpiece 5 is moved rearwardly, i. e., toward the left in the drawing and without depressing the lever 8, the pin 20 will slide along the spring 21 and thereby depress the contact 24 to such an extent that when the member 4 has reached the extreme of its movement the contact 24 will engage the contact 25 and thereby closing the circuit of the sound recording apparatus.

Having thus described our invention, we claim:

1. Control means for photophonographic apparatus comprising brake means, means for releasing the brake means, switch means normally actuated by said releasing means after the release of said brake means, means for actuating said switch means by said releasing means independently of said brake means, and shutter means actuated by a part of said brake means.

2. Control means comprising brake means, means for releasing the brake means, switch means normally actuated by said releasing means after the release of said brake means, means for actuating said switch means by said releasing means independently of said brake means, and shutter means actuated by a part of said brake means.

3. Control means for photophonographic apparatus including a member for initiating operation of the apparatus, a lever connected to the said member for operating the same, a switch in co-operative relation with said lever for operation to close an electrical circuit of said apparatus upon the actuation of the apparatus, and means on said switch co-operating with said lever for operation of the switch independently of movement of said first means.

4. Apparatus of the class described comprising a control member pivotally mounted for longitudinal movement, means connected to said pivot for actuating one portion of the apparatus on longitudinal movement of the said lever, and means independent of said pivot for actuating another portion of the apparatus on either longitudinal movement of the said lever or movement thereof about said pivot.

5. A talking motion picture camera including means for controlling the operation of the mechanism, a shutter connected to said means for closing the picture exposure aperture when the said camera is not in operation, and a switch connected to said means for selectively exciting said sound recording simultaneously with the operation of the camera mechanism or independently thereof.

6. Control means for photophonographic apparatus comprising brake means, means for releasing the brake means, circuit control means normally actuated by said releasing means after the release of said brake means, means for actuating said circuit control means by said releasing means independently of said brake means, and shuttter means actuated by a part of said brake means.

7. Control means comprising brake means, means for releasing the brake means, circuit control means normally actuated by said releasing means after the release of said brake means, means for actuating said circuit control means by said releasing means independently of said brake means, and shutter means actuated by a part of said brake means.

EDWARD W. KELLOGG.
SIDNEY READ, Jr.